US011945589B2

(12) United States Patent
Klaus et al.

(10) Patent No.: US 11,945,589 B2
(45) Date of Patent: Apr. 2, 2024

(54) PASSENGER SEAT CANOPY (71) Applicant: Goodrich Lighting Systems GmbH, Lippstadt (DE)

(72) Inventors: Martin Klaus, Salzkotten (DE); Andre Hessling-Von Heimendahl, Koblenz (DE); Robert Schulten, Munster (DE)

(73) Assignee: GOODRICH LIGHTING SYSTEMS GMBH, Lippstadt (DE)

(*) Notice: Subject to any disclaimer, the term of this patent is extended or adjusted under 35 U.S.C. 154(b) by 376 days.

(21) Appl. No.: 16/713,563

(22) Filed: Dec. 13, 2019

(65) Prior Publication Data
US 2021/0009272 A1    Jan. 14, 2021

(30) Foreign Application Priority Data
Jul. 14, 2019 (EP) .................................. 19186183

(51) Int. Cl.
*B64D 11/06* (2006.01)
*B64D 11/00* (2006.01)

(52) U.S. Cl.
CPC ...... *B64D 11/0606* (2014.12); *B64D 11/0626* (2014.12); *B64D 2011/0053* (2013.01)

(58) Field of Classification Search
CPC ............ B64D 11/0606; B64D 11/0626; B64D 2011/0053; B60Q 3/49; B60Q 3/44; B60Q 3/233
See application file for complete search history.

(56) References Cited

U.S. PATENT DOCUMENTS

| 3,628,829 A | 12/1971 | Heilig |
| 3,971,395 A * | 7/1976 | Lipinski ................. E04H 15/48 D25/16 |
| 4,313,517 A * | 2/1982 | Pivar ..................... B62D 61/08 180/206.7 |
| 4,632,138 A * | 12/1986 | Irwin .................... E04H 15/001 135/901 |

(Continued)

FOREIGN PATENT DOCUMENTS

| BR | 102013032783 A2 * | 12/2015 | ............ B60J 1/2011 |
| CN | 102753436 B * | 5/2015 | ............ B64D 11/06 |

(Continued)

OTHER PUBLICATIONS

European Search Report for Application No. 19186183.0-1010, dated Jan. 30, 2020, 7 pages.

*Primary Examiner* — Hunter B Lonsberry
*Assistant Examiner* — Jalal C Coduroglu
(74) *Attorney, Agent, or Firm* — CANTOR COLBURN LLP (57) ABSTRACT

A canopy is configured to be mounted to a passenger seat of a passenger transport vehicle, in particular an aircraft. The canopy is foldable between a retracted storage configuration and an extended operational configuration. In the operational configuration, the canopy forms a hood establishing a passenger's personal space below the canopy. The canopy comprises at least one functional device which is configured for modifying a physical characteristics of the personal space. The at least one functional device in particular includes at least one of a lighting device configured for lighting the personal space and a venting device configured for venting the personal space.

18 Claims, 6 Drawing Sheets

(56) References Cited

U.S. PATENT DOCUMENTS

| | | | | |
|---|---|---|---|---|
| 4,767,147 | A * | 8/1988 | Kobayakawa | B60J 7/223 |
| | | | | 296/180.1 |
| 4,852,938 | A * | 8/1989 | Hirshberg | B60J 7/0038 |
| | | | | 296/214 |
| 4,906,024 | A * | 3/1990 | Lein | G09B 29/04 |
| | | | | 281/5 |
| 5,282,661 | A * | 2/1994 | Arnberger | B62D 31/006 |
| | | | | 296/190.04 |
| 5,795,018 | A * | 8/1998 | Schumacher | B64D 11/00153 |
| | | | | 297/217.3 |
| 6,095,590 | A * | 8/2000 | Matsuda | B60J 7/223 |
| | | | | 296/180.1 |
| 6,402,225 | B1 * | 6/2002 | Hsia | B62B 9/14 |
| | | | | 296/107.02 |
| 6,742,842 | B2 | 6/2004 | Dowty | |
| 7,118,173 | B2 * | 10/2006 | Kassai | B62B 9/14 |
| | | | | 297/184.13 |
| 7,175,221 | B2 * | 2/2007 | Rajasingham | B62D 21/15 |
| | | | | 296/65.12 |
| 7,585,022 | B2 * | 9/2009 | Achilles | B60R 11/02 |
| | | | | 297/188.16 |
| 8,387,641 | B1 | 3/2013 | Ilan et al. | |
| 8,794,659 | B1 * | 8/2014 | Palmer | B62B 7/105 |
| | | | | 280/648 |
| 9,956,898 | B1 | 5/2018 | Dellock et al. | |
| 2002/0017414 | A1 * | 2/2002 | Collinucci | E06B 5/00 |
| | | | | 180/282 |
| 2002/0096857 | A1 * | 7/2002 | Valdez | B62B 7/126 |
| | | | | 280/293 |
| 2002/0185896 | A1 * | 12/2002 | Tseng | A47C 7/66 |
| | | | | 297/184.15 |
| 2003/0085597 | A1 | 5/2003 | Ludeke et al. | |
| 2004/0016183 | A1 * | 1/2004 | Hoffman | E04H 15/52 |
| | | | | 52/64 |
| 2005/0275257 | A1 * | 12/2005 | McGregor | B60N 2/2842 |
| | | | | 297/219.12 |
| 2006/0001302 | A1 * | 1/2006 | Achilles | B64D 11/0606 |
| | | | | 297/284.1 |
| 2008/0200095 | A1 * | 8/2008 | Guenette | A63H 33/16 |
| | | | | 446/487 |
| 2009/0235964 | A1 * | 9/2009 | Troutman | B62B 9/14 |
| | | | | 135/16 |
| 2010/0045081 | A1 * | 2/2010 | Efthimiou | A47C 7/66 |
| | | | | 297/184.11 |
| 2010/0072732 | A1 * | 3/2010 | Offord | B62B 7/14 |
| | | | | 280/647 |
| 2011/0309658 | A1 * | 12/2011 | Carimati Di Carimate | B62B 9/24 |
| | | | | 297/68 |
| 2014/0097598 | A1 * | 4/2014 | Sundberg | B62B 7/006 |
| | | | | 280/650 |
| 2014/0179212 | A1 * | 6/2014 | Space | B60N 2/5635 |
| | | | | 454/76 |
| 2014/0253821 | A1 * | 9/2014 | Takatoh | G02B 27/0101 |
| | | | | 349/11 |
| 2015/0166166 | A1 * | 6/2015 | Llamas Sandin | B64D 11/0639 |
| | | | | 244/13 |
| 2017/0028886 | A1 * | 2/2017 | Zhang | B60N 2/5657 |
| 2017/0137129 | A1 * | 5/2017 | Hessling-Von Heimendahl | B64D 47/00 |
| 2017/0173923 | A1 * | 6/2017 | Davis | B32B 7/12 |
| 2017/0203848 | A1 * | 7/2017 | Sirous | B64D 11/0621 |
| 2017/0278504 | A1 * | 9/2017 | Ross | G10K 11/17861 |
| 2017/0283065 | A1 * | 10/2017 | Papke | B64D 11/0023 |
| 2017/0341725 | A1 * | 11/2017 | Skahan | B64C 13/044 |
| 2018/0257468 | A1 * | 9/2018 | Cook | B60J 7/12 |
| 2019/0183088 | A1 * | 6/2019 | Yang | A01K 1/0064 |
| 2021/0393823 | A1 * | 12/2021 | Childress | B64D 13/00 |

FOREIGN PATENT DOCUMENTS

| | | | | |
|---|---|---|---|---|
| CN | 205469240 U | * | 8/2016 | B64D 11/06 |
| DE | 102015016159 A1 | * | 7/2016 | B60R 21/21 |
| DE | 102019118230 A1 | * | 1/2021 | |
| EP | 3309072 A1 | | 4/2018 | |
| JP | 2000104318 A | * | 4/2000 | B60N 2/242 |
| JP | 2004321535 A | * | 11/2004 | B60N 2/242 |
| JP | 2004344320 A | * | 12/2004 | |
| JP | 2006070549 A | * | 3/2006 | |
| JP | 2012171580 A | * | 9/2012 | B64C 39/02 |
| WO | WO-2014147449 A1 | * | 9/2014 | B60N 2/242 |
| WO | WO-2017089858 A1 | * | 6/2017 | G06F 3/0488 |

* cited by examiner

PASSENGER SEAT CANOPY

FOREIGN PRIORITY

This application claims priority to European Patent Application No. 19186183.0 filed Jul. 14, 2019, the entire contents of which is incorporated herein by reference.

TECHNICAL FIELD

The present invention is in the field of passenger seats for passenger transport vehicles, such as aircraft, buses, trains/railway carriages or ships. The present invention is in particular related to comfort-enhancing equipment of passenger seats for passenger transport vehicles.

BACKGROUND

Passenger transport vehicles usually comprise a plurality of passenger seats arranged in a number of rows within a passenger cabin. As a result, passengers sitting on said passenger seats share the same passenger cabin. Many passengers experience the crammed atmosphere of a shared passenger cabin as unpleasant and uncomfortable.

It would be beneficial to enhance the comfort and the travel experience of the passengers in a passenger transport vehicle.

SUMMARY

Exemplary embodiments of the invention include a canopy which is configured to be mounted to a passenger seat of a passenger transport vehicle, such as an aircraft, a bus, a train or a ship. The canopy is foldable between a retracted storage configuration and an extended operational configuration. In the operational configuration, the canopy forms a hood establishing a passenger's personal space below the canopy. The canopy comprises at least one functional device which is configured for modifying a physical characteristics of the personal space. Said at least one functional device in particular is a technical device including at least one of a lighting device configured for individually lighting the personal space and a venting device configured for individually venting the personal space.

A canopy according to an exemplary embodiment of the invention allows a passenger to create his/her own personal space around his head. The at least one functional device allows the passenger to modify at least one physical characteristic, in particular the illumination and/or the venting, of the personal space according to his/her current personal desire. The passenger, for example, may switch off the illumination of his/her personal space, created by the canopy, in order to sleep without being disturbed by the cabin light and/or personal reading lights of other passengers. Similarly, the passenger may illuminate his/her own personal space for reading or other activities, without disturbing the other passengers within the cabin.

Similarly, the passenger may individually adjust the venting and the temperature within his/her personal space.

As a result, the travel experience of the passengers is enhanced without increasing the space occupied by each passenger seat.

According to a further embodiment, the canopy comprises at least one foldable sheet. A canopy that comprises at least one foldable sheet is easily foldable between the extended operational configuration and the retracted storage configuration. The canopy in particular may comprise a foldable upper sheet and a foldable lower sheet, defining an internal space between the two sheets, when the canopy is in its operational configuration. An internal space formed between two sheets may allow for a convenient distribution of light and/or air into the passenger's personal space below the canopy.

According to a further embodiment, when the canopy is mounted to a passenger seat and when the canopy is in its operational configuration, the upper and lower sheets of the canopy are arranged closer to each other at a front end of the canopy, facing away from the passenger seat, than at a rear end of the canopy next to the passenger seat. The upper and lower sheets in particular may be spaced apart less than 2.5 cm from each other at the front end of the canopy, and the upper and lower sheets in particular may be spaced apart more than 10 cm from each other at the opposing rear end of the canopy. A canopy, in which the upper and lower sheets of the canopy are arranged closer to each other at a front end of the canopy, facing away from the passenger seat, than at a rear end of the canopy next to the passenger seat, provides an internal space which is well suited for distributing light and/or air into the passenger's personal space below the canopy. Such a canopy further has a good mechanical stability.

According to a further embodiment, the canopy comprises a plurality of support bars supporting the at least one sheet. The support bars in particular may be attached to at least one hinge which is configured for pivotably supporting the support bars at a passenger seat and allowing the canopy to change its configuration between the storage configuration and the operational configuration. A plurality of support bars provide a reliable supporting mechanism for supporting the at least one sheet. Such a supporting mechanism has a low weight and may be provided at low costs.

The support bars may be manually pivotable. Alternatively or additionally, a motor may be provided at the hinge for moving the support bars from the storage configuration into the operational configuration and vice versa.

According to a further embodiment, the lower sheet is at least partly air-permeable, and/or the upper sheet is substantially air-impermeable. A substantially air-impermeable upper sheet prevents air from escaping from the internal space into the environment via the upper sheet. An at least partly air-permeable lower sheet allows air to flow from the internal space into the personal space below the canopy for venting the personal space.

According to a further embodiment, the lower sheet is at least partly transparent or translucent, and/or the upper sheet is substantially opaque. A substantially opaque upper sheet prevents light, emitted into the internal space, from exiting via the upper sheet and disturbing other passengers. An at least partly transparent lower sheet allows light, emitted into the internal space, to pass the lower sheet for illuminating the personal space below the canopy. The lower sheet may be configured for diffusing the light passing the lower sheet, in order to generate a pleasant light distribution within the personal space.

According to a further embodiment, the canopy comprises a venting device configured for blowing air into the personal space. The venting device in particular may comprise at least one air input port configured for receiving air to be blown into the personal space from the environment of from an external source, such as an air conditioning system. A venting device, which is configured for blowing air into the personal space, allows generating a pleasant environment within the personal space. It in particular allows adjusting the temperature and/or the humidity within the personal space as desired by the passenger.

According to a further embodiment, the venting device comprises at least one air baffle and/or nozzle which is configured for directing the air into the personal space. The at least one air baffle and/or nozzle may allow adjusting the amount and/or the direction of the air delivered into the personal space.

Alternatively or additionally, the venting device may comprise a fan, which is configured for blowing the air into the personal space and/or into the internal space. An air baffle, a nozzle and/or a fan allow adjusting the flow of air flowing into the personal space individually according to the respective passenger's personal needs. As a result, the comfort of the passenger may be further enhanced.

According to a further embodiment, the canopy comprises a lighting device configured for illuminating the personal space. Such a lighting device allows the passenger to illuminate his/her personal space according to his/her personal preferences.

The lighting device may include at least one light source, in particular at least one LED. LEDs provide reliable light sources having a high efficiency, which may be provided at low costs.

According to a further embodiment, the lighting device is configured for emitting the light into the internal space. Such a configuration allows using the internal space for distributing the light in order to create a pleasant light distribution within the personal space.

According to a further embodiment, the lighting device comprises a plurality of light sources. The light sources may be controllable, in particular dimmable, independently of each other. The lighting device in particular may be configured such that different portions (zones) of the internal space and/or of the personal space are illuminated by different light sources, respectively. Such a configuration allows changing the illumination of the different portions (zones) of the internal space and/or of the personal space individually. This substantially increases the number of possible light configurations.

According to a further embodiment, the lighting device comprises a plurality of light sources configured for emitting light of different colors. The lighting device in particular may comprise at least three independently controllable, in particular dimmable, light sources emitting light of different colors, such as independent light sources emitting red, green, and blue light, respectively. This allows generating light having almost any arbitrary color by mixing the light emitted by the at least three independently controllable, in particular dimmable, light sources.

According to a further embodiment, the lighting device comprises a controller which is configured for controlling the at least one light source; in particular for controlling the at least one light source based on a passenger's manual input and/or controlling the at least one light source automatically based on the time of day, the exceeded travel time, the cabin light and/or the other external parameters. For example, in an aircraft, the lighting device may be switched on at a predetermined time before the landing in order to wake up the passenger in good time before the landing.

According to a further embodiment, the controller is configured for generating a gradual change of color between at least two portions (zones) of the internal space and/or the personal space for creating a pleasant light distribution within the personal space.

Exemplary embodiments of the invention further include a passenger seat comprising a canopy according to any of the exemplary embodiment of the invention, as described above. The passenger seat in particular comprises a seat back and the canopy in particular is mounted to the seat back of the passenger seat. The additional features, modifications, and effects, described above with respect to the canopy, apply to the passenger seat in an analogous manner.

According to a further embodiment, the passenger seat further comprises at least one air duct configured for supplying air to the canopy.

According to a further embodiment, the at least one light source, configured for illuminating the internal space and/or the personal space established by the canopy in its operational configuration, is arranged next to or even mounted to the passenger seat.

Exemplary embodiments of the invention also include passenger transport vehicles such as aircraft, buses, trains/railway carriages and/or ships, comprising at least one passenger seat according to an exemplary embodiment of the invention. In particular, the passenger transport vehicle may have a plurality of passenger seats each equipped with a canopy as described herein. The additional features, modifications, and effects, described above with respect to the canopy, apply to the passenger transport vehicle in an analogous manner. The aircraft may in particular be an airplane, such as a large passenger airplane, in particular a passenger airplane seating more than 50 passengers or more than 100 passengers or more than 200 passengers.

BRIEF DESCRIPTION OF THE FIGURES

Further exemplary embodiments of the invention will be described with respect to the accompanying drawings, wherein.

DETAILED DESCRIPTION

Figure 1:
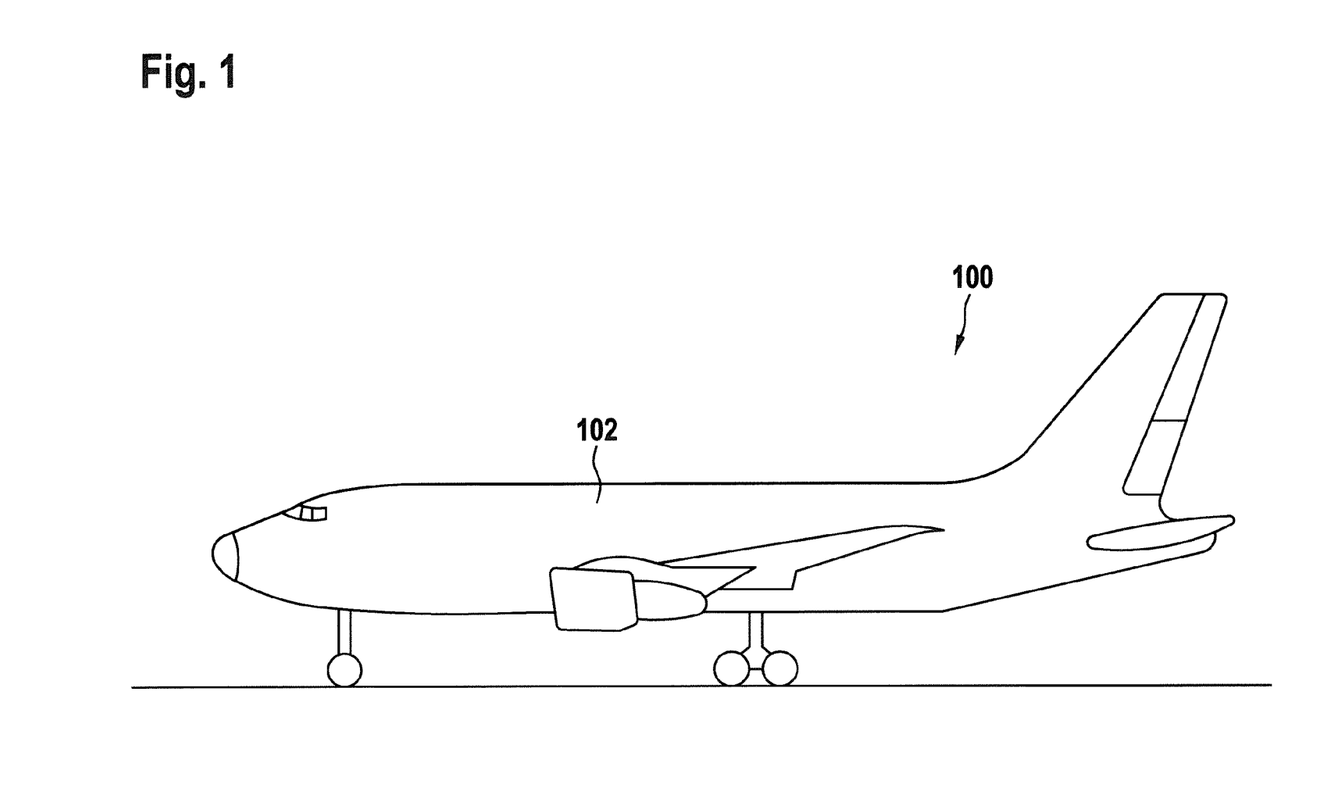
FIG. 1 schematically shows an aircraft in accordance with an exemplary embodiment of the invention having a passenger cabin.

FIG. 1 shows a schematic side view of an aircraft 100 with a passenger cabin 102. The aircraft 100 is equipped with a plurality of passenger seats each having a canopy in accordance with an exemplary embodiment of the invention. As the aircraft 100 is shown from the outside, the passenger seats are not depicted in FIG. 1.

Figure 2:
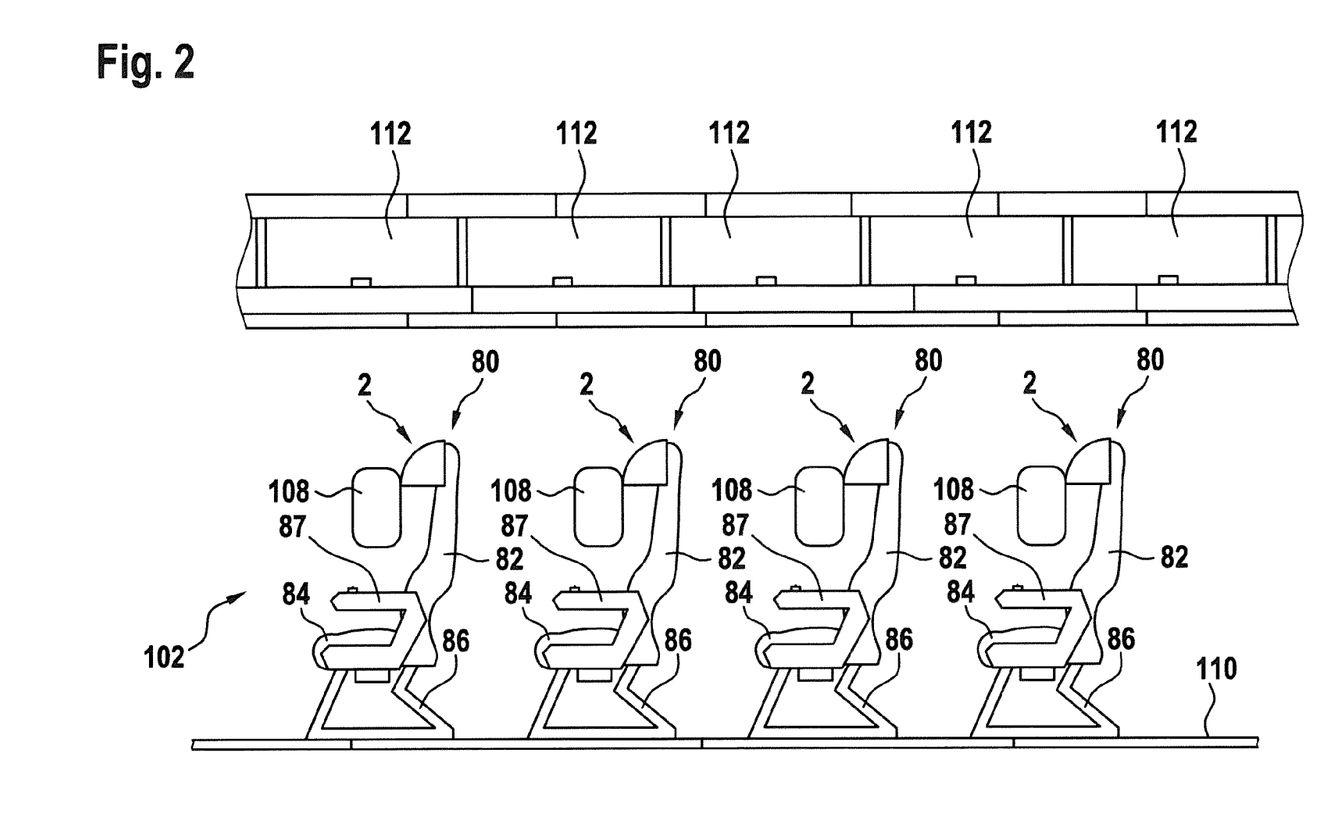
FIG. 2 shows a portion of the passenger cabin of the aircraft of FIG. 1.

FIG. 2 shows a sectional view of a portion of the passenger cabin 102 of the aircraft 100. Four seats 80, also referred to as passenger seats 80, are depicted in FIG. 2. The passenger seats 80 are mounted to a floor 110 of the passenger cabin 102. Each of the depicted passenger seats 80 belongs to a different seat row. Each seat row usually comprises additional passenger seats 80, which are not visible in FIG. 2, as they are arranged behind and therefore hidden by the depicted passenger seats 80.

For each of the seat rows, a window 108 is provided, which allows the passengers to view the outside of the aircraft. Further, a plurality of overhead baggage compartments 112 are shown, which provide storage space for the passengers baggage.

Each of the passenger seats 80 has a seat back (backrest) 82, a seat pan 84, a seat base 86, and an arm rest 87. The arm rest 87 may be pivotable around a horizontal axis. The seat base 86 supports the seat back 82 and the seat pan 84. A canopy 2 according to an exemplary embodiment of the invention is mounted to each of the passenger seats 80, respectively.

Figure 3:
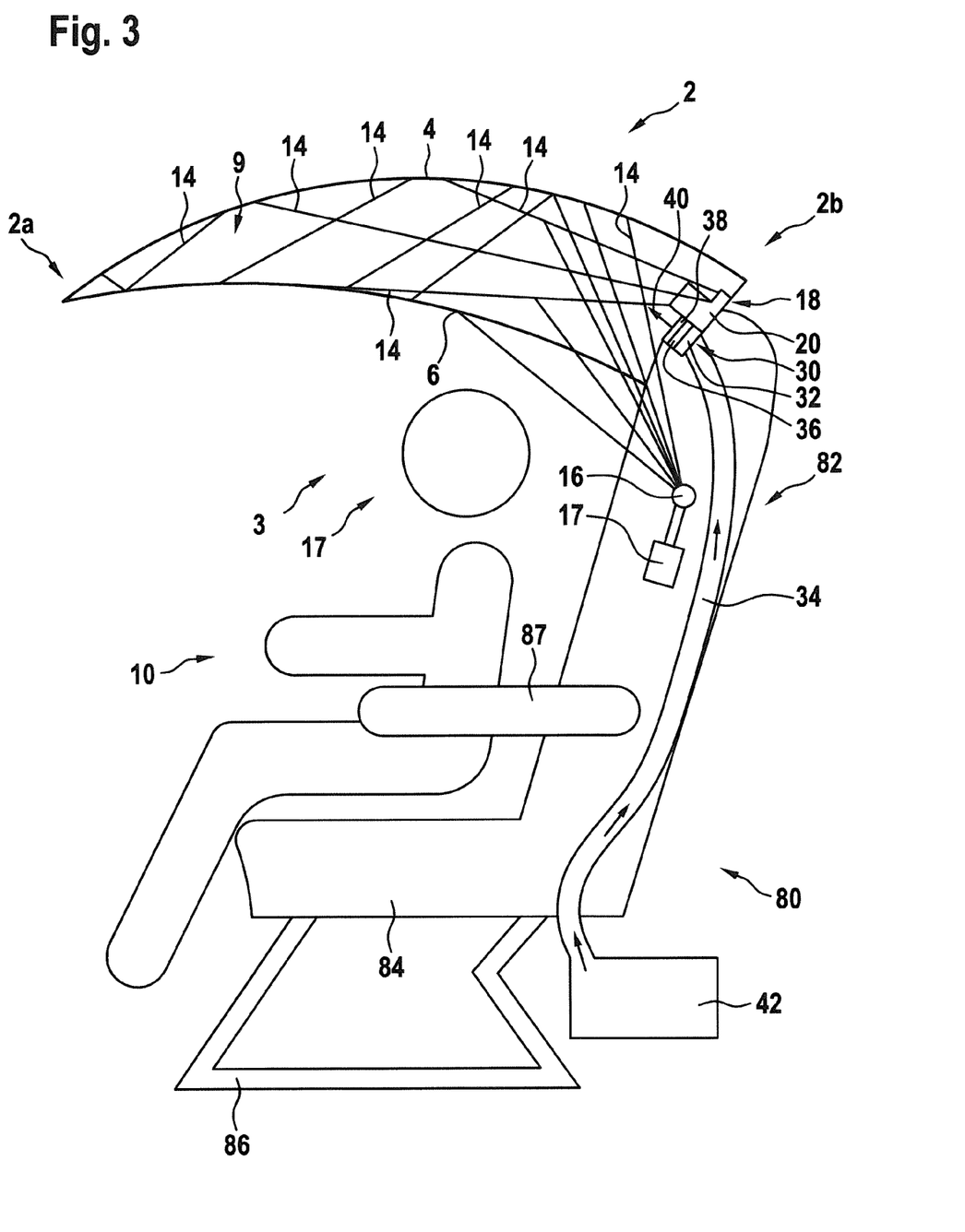
FIG. 3 depicts a sectional side view of a passenger seat with a canopy according to an exemplary embodiment of the invention in an extended operational configuration.
Figure 4:
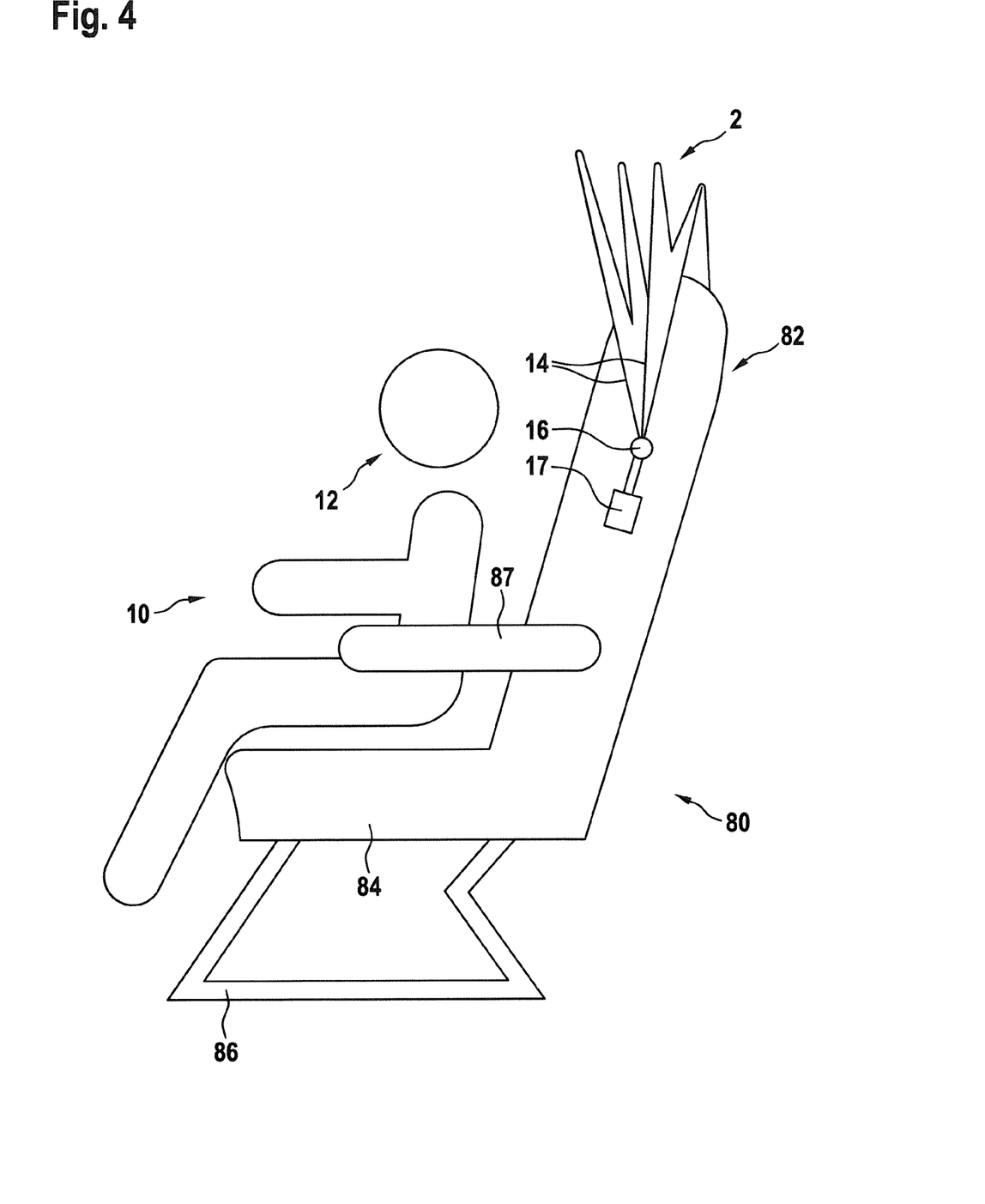
FIG. 4 depicts a sectional side view of the passenger seat with the canopy in a retracted storage configuration.
Figure 5:
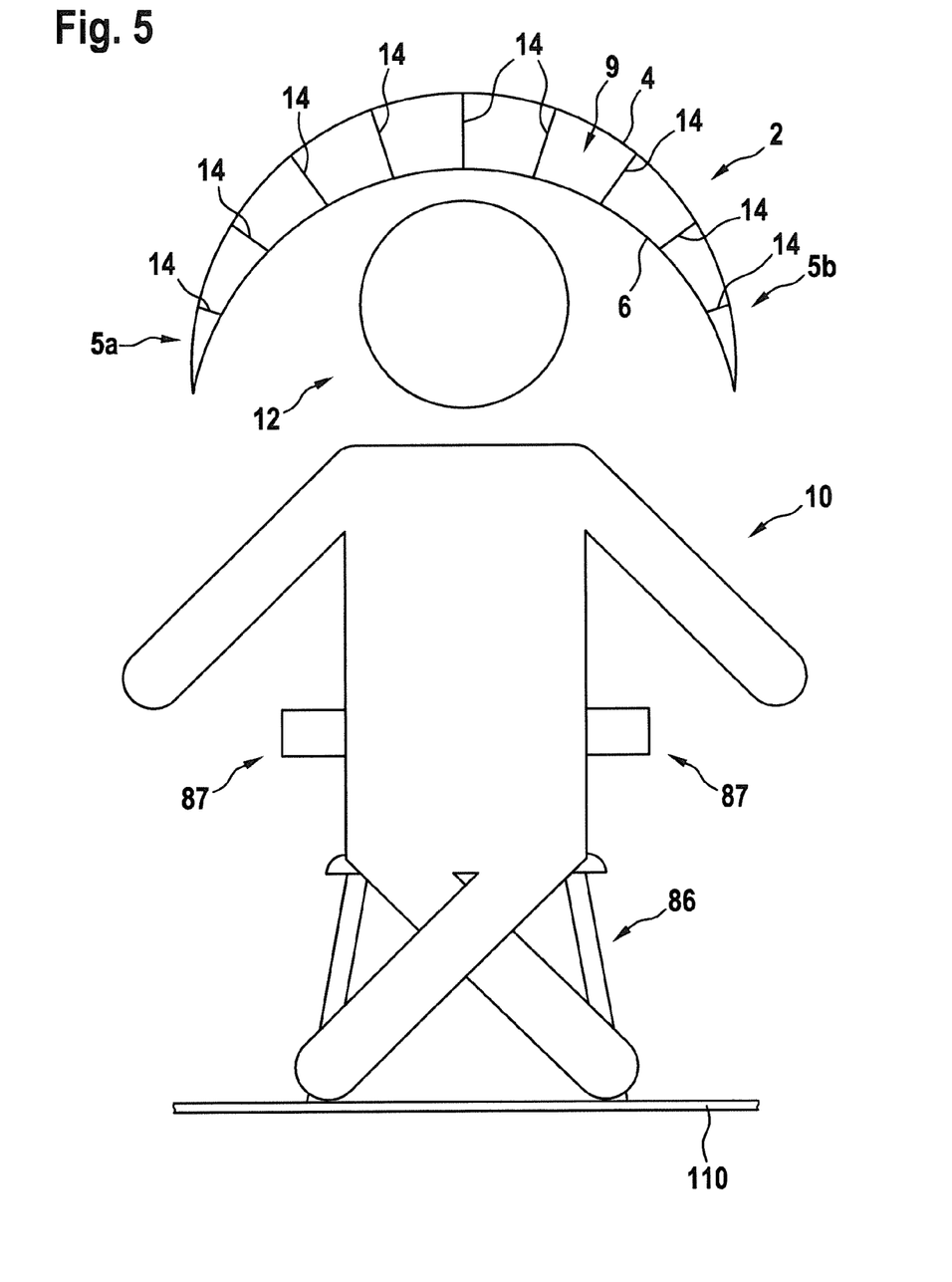
FIG. 5 depicts a sectional front view of the passenger seat with the canopy in an extended operational configuration.

FIGS. 3 and 4 depict a sectional side view of a passenger seat 80 comprising a canopy 2 according to an exemplary embodiment of the invention. FIG. 5 depicts a sectional front view of the canopy 2.

FIGS. 3 and 5 depict the canopy 2 in an extended operational configuration, creating a passenger's personal space 3 below the canopy 2. In FIG. 4, the canopy 2 is arranged in a retracted storage configuration close to an upper portion of the seat back 82.

The exemplary embodiment of the canopy 2, depicted in FIGS. 3 to 5, comprises two foldable sheets 4, 6 including an upper sheet 4 and a lower sheet 6. In the extended operational configuration of the canopy 2, depicted in FIGS. 3 and 5, the two foldable sheets 4, 6 extend from an upper portion of the seat back 82 over the seat pan 84, covering and enclosing the head 12 of a passenger 10 sitting on the passenger seat 80. The sheets 4, 6 in particular may form a hood comprising lateral portions 5a, 5b and enclosing the passenger's head 12, as depicted in FIG. 5.

An internal space 9 is formed between the sheets 4, 6, when the canopy 2 is in its operational configuration, shown in FIGS. 3 and 5.

In the operational configuration, the upper and lower sheets 4, 6, are arranged closer to each other at a front end 2a of the canopy 2, facing away from the seat back 82, than at the rear end 2b of the canopy 2 next to the seat back 82 (see FIG. 3).

The upper and lower sheets 4, 6 in particular may be spaced apart less than 2.5 cm from each other at the front end 2a of the canopy 2, and the upper and lower sheets 4, 6 may be spaced apart more than 10 cm from each other at the rear end 2b of the canopy 2.

The canopy 2 further comprises a plurality of support bars 14 supporting the two sheets 4, 6. A hinge 16 is mounted to each lateral side of the seat back 82, respectively. The lateral ends of the support bars 14 are attached to the two hinges 16, so that the support bars 14 may be moved, in particular pivoted, between the extended operational configuration, depicted in FIGS. 3 and 5, and the retracted storage configuration, depicted in FIG. 4.

The support bars 14 may be manually pivotable. Alternatively or additionally, at least one motor 17, which is configured for moving the support bars 14 between the extended operational configuration and the retracted storage configuration, may be provided.

Each support bar 14 may comprise a plurality of support bar portions, which are pivotably attached to each other in order to allow the support bars 14 to extend and retract, as depicted in FIGS. 3 and 4.

The support bars 14 and/or at least one of the hinges 16 may be provided with a locking mechanism, which is configured for preventing an undesired folding or unfolding of the canopy 2.

The canopy 2 further includes a lighting device 18 (see FIG. 3). The lighting device 18 comprises at least one light source 20, for example at least one LED, and is configured for lighting the personal space 3, created by the canopy 2 in the extended operational configuration. The lighting device 18 may be located next to the seat back 82. The lighting device 18 also may be attached to the seat back 82. The lighting device 18 in particular may be configured for emitting the light into the internal space 9, formed between the two sheets 4, 6 of the canopy 2.

The upper sheet 4 may be substantially opaque, preventing the light emitted by the lighting device 18 from passing through the upper sheet 4, in order to avoid disturbing other passengers 10 by the light emitted by the lighting device 18. A substantially opaque upper sheet 4 further prevents cabin light or light emitted by other passenger's personal readings lights from entering into the passenger's personal space 3 below the canopy 2.

An inner side of the upper sheet 4, facing the internal space 9, may be reflective or diffusely reflective for reflecting light, which is emitted by the lighting device 18 towards the upper sheet 4, back towards the lower sheet 6.

The lower sheet 6 is at least partially transparent or translucent, in order to allow light emitted from the lighting device 18 to pass the lower sheet 6, thus illuminating the passenger's personal space 3. The lower sheet 6 may be configured to diffuse the light, passing the lower sheet 6, for creating a pleasant light distribution within the personal space 3.

The lighting device 18 may comprise a single light source 20 or a plurality of light sources 20. A controller 22 may be provided for controlling the operation of the light source(s) 20.

All light sources 20 may be configured for emitting light of the same color, in particular white light, in particular white light having a correlated color temperature of more than 2500 K. Alternatively, in case a plurality of light sources 20 are provided, the light sources 20 may be configured for emitting light having different colors. The lighting device 18 in particular may comprise at least three independently controllable, in particular dimmable, light sources 20, which are configured for emitting light of different colors, such as independently controllable light sources 20 emitting red, green, and blue light, respectively. Such a configuration allows illuminating the personal space 3 with almost any desired color by mixing the light emissions of the different light sources 20.

The lighting device 18 also may be configured such that different portions of the internal space 9 and/or of the personal space 3 are illuminated by different light sources 20, respectively. Such a configuration allows for creating different light zones, which may be illuminated with light of different intensities or colors, within the internal space 9 and/or the personal space 3.

Figure 6:
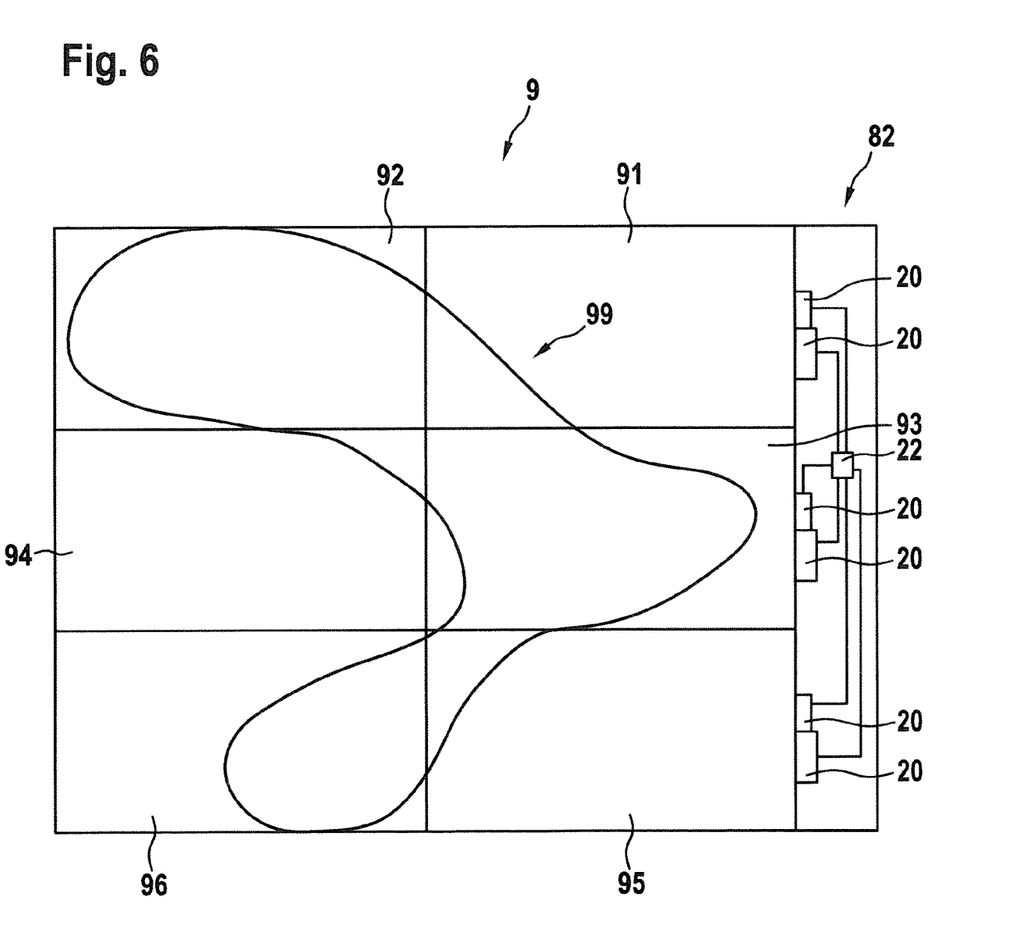
FIG. 6 depicts a schematic plane view of an exemplary configuration of six different light zones of the area below the canopy.

FIG. 6 depicts a schematic plane view, as seen from the passenger seat 80 below the canopy 2, of an exemplary configuration of six different zones 91-96. The zones include near zones 91, 93, 95, which are located closer to the seat back 82 than far zones 92, 94, 96, which are located at a greater distance from the seat back 82. The zones 91-96 also may be divided in right zones 91, 92, central zones 93, 94, and left zones 95, 96. The number of six different zones 91-96 is only exemplary. The skilled person understands that a smaller or larger number of zones 91-96 may be employed.

In an exemplary embodiment, each zone 91-96 may be illuminated individually. In one scenario, all zones 91-96 may be illuminated with bright white light for reading and/or working. In another scenario, none of the zones 91-96 may be illuminated, in order to allow the passenger 10 to sleep.

In further scenarios, each zone 91-96 may be illuminated with a different color. Adjacent zones 91-96 in particular may be illuminated with gradually changing colors, similar to a so called "Lava-Lamp", and/or the colors may change over time in order to create a pleasant and sedative lighting situation within the personal space 3 below the canopy 2. By employing appropriate light sources 20, an individual light pattern 99, extending over a plurality of the zones 91-96, may be generated.

Referring again to FIG. 3, the canopy 2 additionally comprises a venting device 30 which is configured for venting the personal space 3.

The venting device 30 in particular is configured for blowing a flow of air 40 into the internal space 9, formed between the upper and lower sheets 4, 6.

The lower sheet 6 may be at least partly air-permeable for allowing the air 40, blown into the internal space 9, to pass from the internal space 9 through the lower sheet 6 into the personal space 3. The upper sheet 4 may be substantially air-impermeable, in order to prevent air 40 blown into the internal space 9 from escaping from the internal space 9 through the upper sheet 4 into the environment, which would deteriorate the efficiency of the venting device 30.

In the exemplary embodiment depicted in FIG. 3, the venting device 30 comprises an air input port 32, which is configured for receiving the air 40 to be blown into the personal space 3 from an air duct 34, such as a hose or pipe, extending through the seat back 82 of the passenger set 80. A distal end of the air duct 34, opposite to the venting device 30, may be connected to an output of an air conditioning system 42, in order to supply air 40 from the air conditioning system 42 to the venting device 30.

The venting device 30 may comprise a fan 36, which allows controlling the amount of air 40 blown into the internal space 9/personal space 3 individually for each passenger seat 80. The fan 36 may be arranged close to the input port 32. Alternatively or additionally, a fan may be arranged along the extension of the air duct 34 or at the distal end of air duct 34, in particular below the passenger seat 80.

The venting device 30 may further comprise at least one air baffle and/or nozzle 38, arranged downstream of the air input port 32 and/or fan 36 and configured for supplying the air 40 in a predetermined direction into internal space 9/personal space 3. The air baffle and/or nozzle 38 may be adjustable, in order to allow adjusting the amount and/or the direction of the flow of air 40 delivered into internal space 9/personal space 3 according to the personal preferences of the respective passenger 10. Optionally, the venting device 30 may comprise a plurality of air baffles and/or nozzles 38. In such a configuration, each air baffle and/or nozzle 38 may be configured for directing air 40 into a different zone 91-96 (cf. FIG. 6) of the internal space 9. This allows customizing the flow of air 40 delivered into the internal space 9/personal space 3 very individually in accordance with the personal preferences of the respective passenger 10.

Although the exemplary embodiment of the canopy 2 depicted in FIG. 3 comprises both, a lighting device 18 and a venting device 30, exemplary embodiments of the invention also include canopies 2 comprising only either a lighting device 18 or a venting device 30, respectively. Further, although the exemplary embodiment of the canopy 2 depicted in FIG. 3 comprises both an upper sheet 4 and a lower sheet 6, the canopy 2 may also have only one sheet, with the lighting device 18 and/or the venting device 30 modifying the physical characteristics of the personal space below said one sheet.

Exemplary embodiments of the invention further include passengers seats 80, comprising a canopy 2 according to an exemplary embodiments of the invention, and passenger transport vehicles 100, such as aircraft, buses, trains/railway carriages and/or ships, comprising at least one passenger seat 80 according to an exemplary embodiment of the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A canopy configured to be mounted to a passenger seat of a passenger transport vehicle the canopy being foldable between a retracted storage configuration and an extended operational configuration;
   wherein the canopy, in the operational configuration, forms a hood establishing a passenger's personal space below the canopy; and
   wherein the canopy comprises:
      a foldable upper sheet and a foldable lower sheet defining an internal space in between the two sheets when the canopy is in its operational configuration, wherein the foldable lower sheet is at least partly transparent or translucent and wherein the foldable upper sheet is substantially opaque; and
      at least one functional device which is configured for modifying a physical characteristics of the personal space, wherein the at least one functional device includes:
         a lighting device configured for lighting the personal space by emitting light into the internal space formed between the two sheets when the canopy is in its operational configuration.

2. The canopy according to claim 1, wherein, when the canopy is mounted to a passenger seat and is in its operational configuration, the upper and lower sheets are arranged closer to each other at a front end of the canopy, facing away from the passenger seat, than at a rear end of the canopy next to the passenger seat, wherein the upper and lower sheets are spaced apart less than 2.5 cm from each other at the front end of the canopy and wherein the upper and lower sheets are spaced apart more than 10 cm from each other at the rear end of the canopy.

3. The canopy according to claim 1, wherein the canopy comprises a plurality of support bars supporting the foldable upper sheet and the foldable lower sheet.

4. The canopy according to claim 3, wherein the support bars are attached to at least one hinge, which is configured for pivotably supporting the support bars at a passenger seat in a configuration which allows the canopy to change its configuration between the storage configuration and the operational configuration.

5. The canopy according to claim 1, wherein the at least one functional device further includes a venting device configured for blowing air into the internal space formed between the two sheets when the canopy is in its operational configuration, wherein the venting device in particular comprises at least one air input port configured for receiving air to be blown into the personal space.

6. The canopy according to claim 1, wherein the lighting device includes at least one light source configured for emitting light into the internal space.

7. The canopy according to claim 6, wherein the lighting device comprises a plurality of light sources, wherein the lighting device in particular is configured such that different portions of the internal space or of the personal space are illuminated by different light sources.

8. The canopy according to claim 7, wherein the lighting device comprises a plurality of light sources configured for emitting light of different colors, wherein the lighting device in particular comprises at least three independently controllable, in particular dimmable, light sources emitting light of different colors, such as independently controllable light sources emitting red, green, and blue light, respectively.

9. A passenger seat comprising:
a seat back; and
a canopy according to claim 1, mounted to the seat back;
wherein the lighting device of the canopy comprises at least one light source, configured for emitting light into the internal space between the two sheets when the canopy is in its operational configuration, and wherein the at least one light source of the canopy is arranged next to or mounted to the passenger seat.

10. An aircraft comprising:
at least one passenger seat, the passenger seat comprising:
a seat back;
a canopy according to claim 1, mounted to the seat back;
wherein the lighting device of the canopy comprises at least one light source, configured for emitting light into the internal space between the two sheets when the canopy is in its operational configuration, and wherein the at least one light source of the canopy is arranged next to or mounted to the passenger seat.

11. The canopy according to claim 1, wherein the canopy comprises a plurality of support bars supporting the foldable upper sheet and the foldable lower sheet.

12. A canopy configured to be mounted to a passenger seat of a passenger transport vehicle the canopy being foldable between a retracted storage configuration and an extended operational configuration;
wherein the canopy, in the operational configuration, forms a hood establishing a passenger's personal space below the canopy; and
wherein the canopy comprises:
a foldable upper sheet and a foldable lower sheet defining an internal space in between the two sheets when the canopy is in its operational configuration; and
at least one functional device which is configured for modifying a physical characteristics of the personal space, wherein the at least one functional device includes
a venting device configured for venting the personal space by blowing air into the internal space formed between the two sheets when the canopy is in its operational configuration; and
wherein the foldable lower sheet is at least partly air-permeable and wherein the foldable upper sheet is substantially air-impermeable.

13. The canopy according to claim 12, wherein, when the canopy is mounted to a passenger seat and is in its operational configuration, the upper and lower sheets are arranged closer to each other at a front end of the canopy, facing away from the passenger seat, than at a rear end of the canopy next to the passenger seat, wherein the upper and lower sheets are spaced apart less than 2.5 cm from each other at the front end of the canopy and wherein the upper and lower sheets are spaced apart more than 10 cm from each other at the rear end of the canopy.

14. The canopy according to claim 12, wherein the venting device comprises at least one air input port configured for receiving air to be blown into the internal space formed between the two sheets when the canopy is in its operational configuration.

15. The canopy according to claim 12, wherein the venting device comprises at least one air baffle or nozzle configured for directing the air into the internal space formed between the two sheets when the canopy is in its operational configuration.

16. The canopy according to claim 12, wherein the venting device comprises a fan configured for blowing the air into the internal space formed between the two sheets when the canopy is in its operational configuration.

17. A passenger seat comprising:
a seat back;
a canopy according to claim 12, mounted to the seat back; and
at least one air duct configured for supplying air to the canopy.

18. An aircraft comprising:
at least one passenger seat, the passenger seat comprising:
a seat back;
a canopy according to claim 12, mounted to the seat back; and
at least one air duct configured for supplying air to the canopy.

* * * * *